United States Patent [19]

Boehner

[11] Patent Number: 5,221,918

[45] Date of Patent: Jun. 22, 1993

[54] BACK-UP WARNING LAMP USEFUL FOR SUPPLEMENTAL INFLATABLE RESTRAINT SYSTEMS

[75] Inventor: Kurt E. Boehner, Fenton, Mich.

[73] Assignee: Saturn Corporation, Troy, Mich.

[21] Appl. No.: 743,965

[22] Filed: Aug. 12, 1991

[51] Int. Cl.$^5$ .............................. B60Q 1/00
[52] U.S. Cl. ........................ 340/459; 340/458; 340/440; 340/429; 340/457.1; 340/642; 364/187
[58] Field of Search ............... 340/458, 459, 438, 439, 340/440, 429, 457.1, 641, 642; 364/184, 186, 187

[56] References Cited

U.S. PATENT DOCUMENTS

| | | | |
|---|---|---|---|
| 3,622,974 | 11/1971 | Best et al. | 340/53 |
| 3,745,523 | 7/1973 | Lewis et al. | 340/52 R |
| 3,774,151 | 11/1973 | Lews et al. | 340/61 |
| 3,887,818 | 6/1975 | Hollins | 307/10 SB |
| 4,158,191 | 6/1979 | Rogers et al. | 340/52 H |
| 4,173,750 | 11/1979 | Riba | 340/80 |
| 4,243,971 | 1/1981 | Suchowerskyj et al. | 340/52 H |
| 4,565,991 | 1/1986 | Lupoli et al. | 340/52 R |
| 4,641,041 | 1/1987 | Mattes et al. | 307/10 R |
| 4,673,912 | 6/1987 | Kumasaka et al. | 340/52 R |
| 4,701,628 | 10/1987 | Kumasaka et al. | 307/9 |
| 4,739,309 | 4/1988 | Brauninger et al. | 340/534 |
| 4,757,299 | 7/1988 | Ueda | 340/52 F |
| 4,835,513 | 5/1989 | McCurdy et al. | 340/438 |
| 4,849,733 | 7/1989 | Conigliaro et al. | 340/457.1 |
| 4,893,109 | 1/1990 | Vrabel et al. | 340/438 |
| 4,910,494 | 3/1990 | Tamai | 340/438 |

FOREIGN PATENT DOCUMENTS 0202124 11/1983 Japan .......................... 340/458

OTHER PUBLICATIONS

3 Research Disclosures (Apr. 1991).

Primary Examiner—Jin F. Ng
Assistant Examiner—Nina Tong
Attorney, Agent, or Firm—Anthony L. Simon

[57] ABSTRACT

A vehicle indicator system is set forth for a vehicle that has first and second instrumentation indicator lamps for indicating the condition of first and second vehicle systems. Instead of the first indicator lamp having a backup lamp in case the first indicator lamp burns out, the second indicator lamp serves a dual purpose as the backup lamp for the first indicator lamp.

1 Claim, 4 Drawing Sheets

BACK-UP WARNING LAMP USEFUL FOR SUPPLEMENTAL INFLATABLE RESTRAINT SYSTEMS

This invention relates to telltales in vehicle instrumentation systems.

BACKGROUND OF THE INVENTION

Typically vehicle instrumentation displays include indicator lamps to signal to a vehicle operator the state of certain vehicle systems. Such indication lamps include ISO seatbelt lamps, supplemental inflatable restraint (SIR) lamps, anti-lock brake system lamps, low fuel indicator lamps, low coolant indicator lamps, low battery indicator lamps, low oil pressure indicator lamps, etc., and are well known to those skilled in the art.

In certain circumstances, it may be desirable to implement a backup indicator lamp in case the primary indicator lamp does not function properly. However, adding backup lamps to the vehicle instrumentation increases vehicle cost. For example, wire for the lamp circuit, the lamp itself, and a driver circuit to drive the lamp must all be added to the vehicle. What is desired is the comfort of a backup system for certain indicator lamps without the added cost of additional backup warning lamps.

SUMMARY OF THE PRESENT INVENTION

This invention provides a backup for instrumentation indicator lamps without requiring the added cost of implementing additional backup warning lamps. This invention achieves this benefit by using an existing lamp already in the vehicle as a primary indicator for a first system and a backup or secondary indicator for a second vehicle system. An example lamp which may be given such a dual purpose according to this invention may be the ISO seat belt indicator lamp since such lamps are required in all vehicles. The backup indicator circuit of this invention may or may not include a chime module, such as the chime module for the seat belt system.

Structurally, this invention includes a vehicle with first and second systems and first and second primary lamps for indicating to a vehicle operator conditions of the first and second systems. The invention includes means for lighting the first lamp if a first system criteria is met, and means for lighting the second lamp if a second system criteria is met. Also included are means for testing the first lamp and drive circuit and means to light the second lamp if either the first lamp or drive circuit for the first lamp is found to fail. More specific implementations of this invention are set forth in the detailed description below.

DETAILED DESCRIPTION OF THE INVENTION

Figure 1:
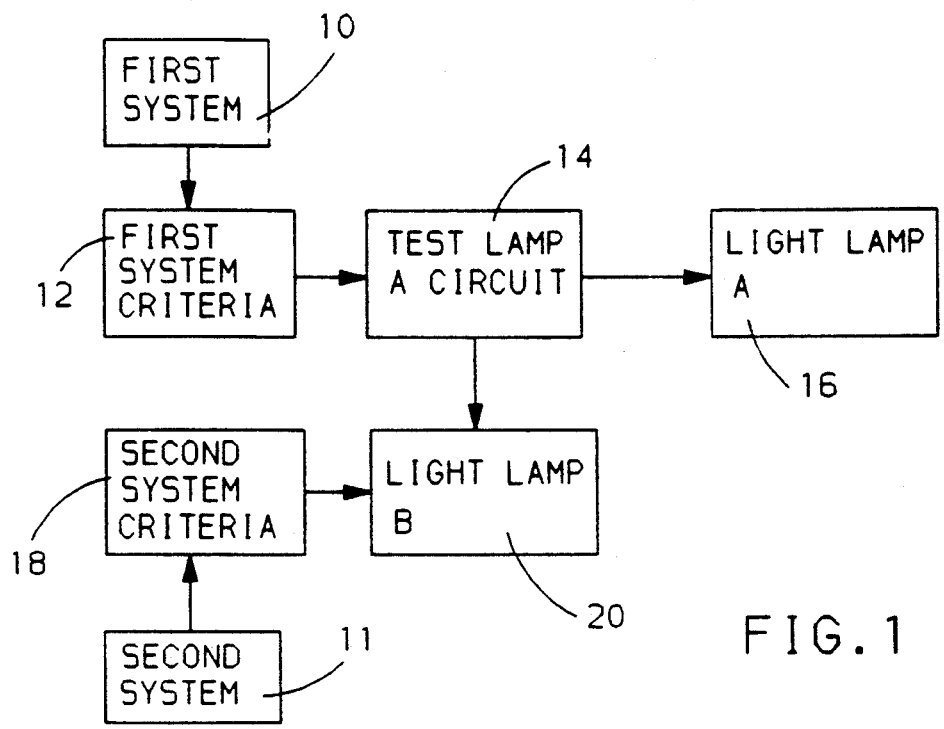
FIG. 1 is a block diagram illustrating the apparatus of this invention.

Referring to FIG. 1, blocks 10 and 11 illustrate first and second vehicle systems. Blocks 12 and 18 illustrate conventional criteria means for determining whether indicator lamps for the first and second systems should be lit, communicating to a vehicle operator information relating to the first and second systems. The first criteria means 12 checks the first vehicle system, and decides if, under a first criteria, a fault in the first system requires that a first lamp, lamp A, be lit. Likewise the second criteria means 18 checks the condition of a second system under a second criteria to determine if a second indicator lamp, lamp B, should be lit.

The first and second criteria means 12 and 18 may include an actual check of the first and second systems or may comprise criteria that always decides to light the indicator lamp. For example, some vehicles may always light the seatbelt indicator lamp for a time-out period immediately following vehicle ignition on, even if the driver side seatbelt is already fastened. In such implementations, there is no actual "check" of the system, and the criteria is to always light the lamp during the time-out period at vehicle start-up.

Lamp A is the primary indicator lamp for the first system. The circuit for lamp A 16 includes the drive circuit for lamp A and lamp A, and such circuits are well known to those skilled in the art. The means for checking the circuit for lamp A 14 checks both the drive circuit for lamp A and lamp A. If the circuit for lamp A 16 is in proper operating condition, and the first criteria means 12 determines that lamp A is to be lit, the circuit for lamp A 16 lights lamp A. If on the other hand the circuit for lamp A 16 is not functioning properly, the circuit for lamp B 20 lights lamp B. The circuit for lamp B 20 also lights lamp B if the second criteria means 18 determines that lamp B is to be lit.

Figure 2:
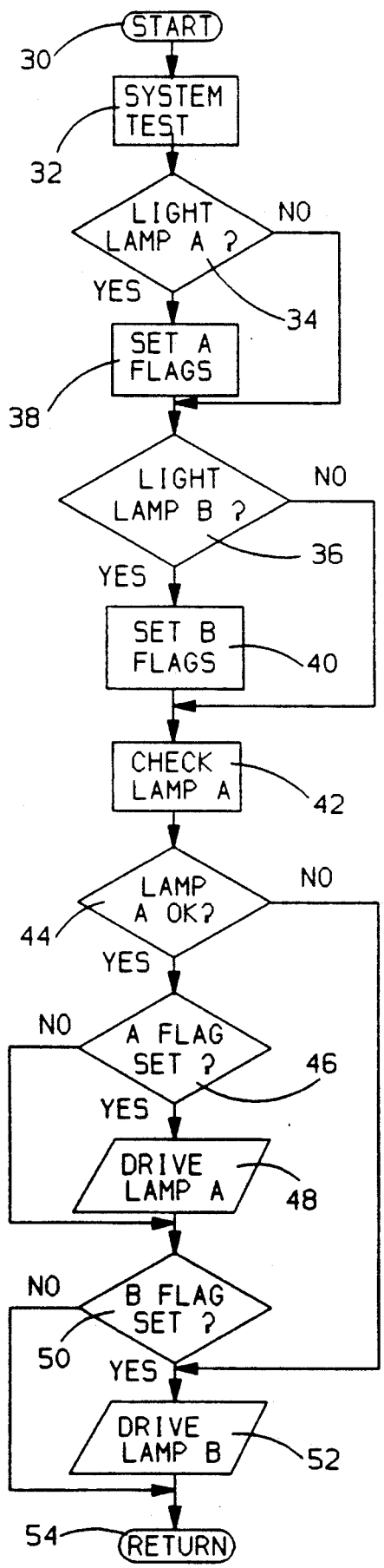
FIG. 2 is a computer flow diagram for a routine illustrating a general implementation of this invention.

Referring to FIG. 2, a general computer implementation of this invention starts at block 30 and continues to block 32 where routine checks are run on the first and second systems. Depending upon the results of the checks for the first system at block 32, block 34 decides whether or not lamp A is to be lit. If lamp A is to be lit, the computer continues to block 38 where it sets a flag indicating that lamp A is to be lit.

The computer then continues to block 36 where, based on the checks of the second system at block 32, the computer decides if lamp B is to be lit. If the computer decides that lamp B is to be lit, the computer continues to block 40 and sets a flag in computer memory indicating that lamp B should be lit.

The computer then continues to block 42 where a check of the circuit for lamp A is performed. The circuit for lamp A may be checked by measuring the voltage across lamp A and its driver circuit and comparing that voltage with a predetermined acceptable voltage range. Alternatively, the circuit for lamp A may be checked by sending a drive signal to lamp A and detecting, through a photocell or photodiode, whether or not lamp A is lit.

In response to the check of the circuit for lamp A at block 42, the computer at block 44 decides if the circuit for lamp A is in operating condition. A typical fault for the circuit for lamp A is if the light bulb for lamp A is burnt out, in which case block 42 would have detected an open circuit across lamp A.

If lamp A is in proper operating condition, the computer continues to block 46, where it determines if the flag for lamp A has been set. If the flag for lamp A is set, the computer continues to block 48 where it outputs a drive command to illuminate lamp A.

If, at block 44, lamp A is determined to not be in proper operating condition, the computer continues to block 52 to drive lamp B, to indicate that lamp A is not properly functioning.

If at block 46, the flag for lamp A is not set, the computer continues to block 50. At block 50 the computer determines if the flag for lamp B is set. If the flag for lamp B is set at block 50, the computer continues to block 52 where it outputs a drive command to illuminate lamp B. If at block 50, the flag for lamp B is not set, the computer continues to block 54, where it ends the systems check and lamp indication routine.

Figure 3:
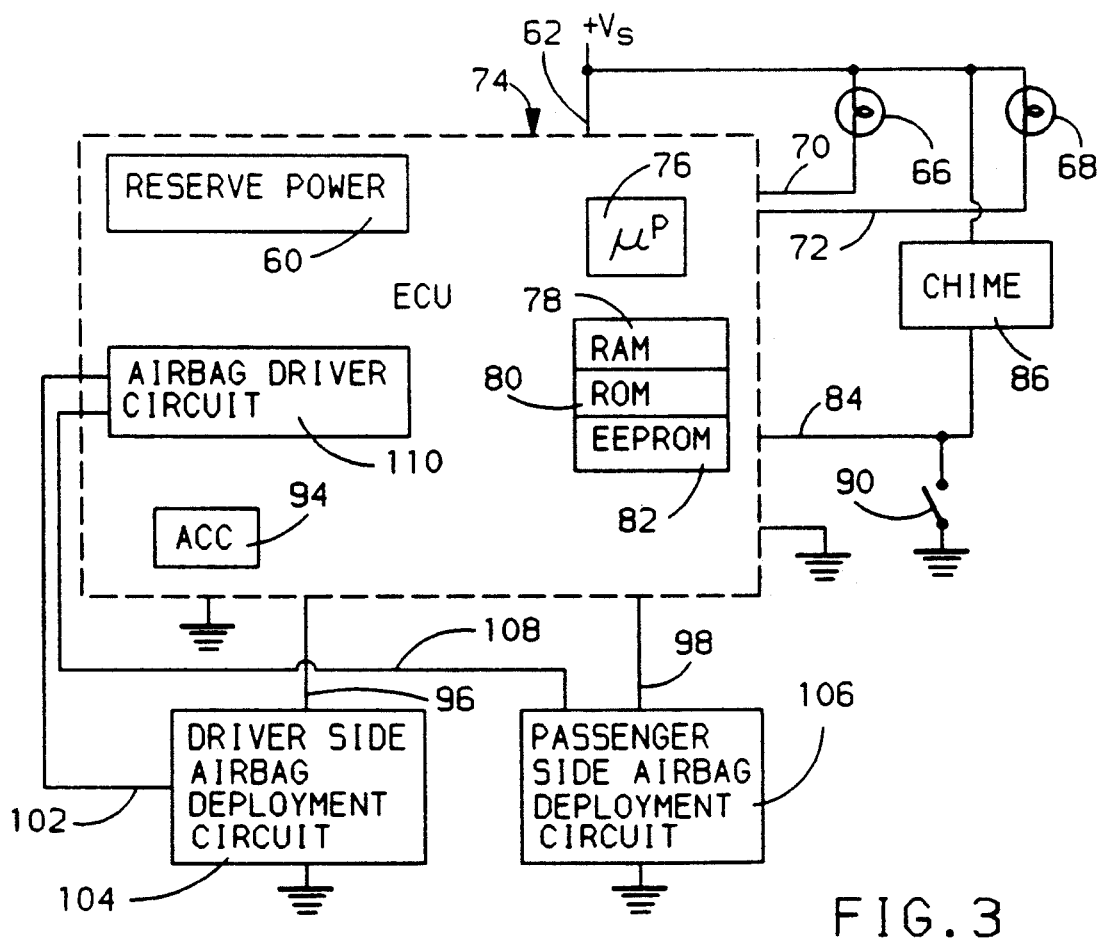
FIG. 3 is a schematic diagram of an implementation of this invention in which the supplemental inflatable restraint system indicator lamp and ISO seatbelt indicator lamp are shown.

Referring to the example implementation of this invention shown in FIG. 3, a typical supplemental inflatable restraint system includes an electronic control unit 74 comprising microprocessor 76, RAM 78, ROM 80 and EEPROM 82. Also typically included in a supplemental inflatable restraint system is reserve power unit 60, accelerometer 94, driver side airbag deployment circuit 104, passenger side airbag deployment circuit 106 (if a passenger side airbag is in the vehicle), and airbag driver circuit 110. The reserve power unit 60, airbag driver circuit 110 and accelerometer 94 comprise part of the electronic control unit 74.

Lamp 66 is the primary indicator lamp for the supplemental inflatable restraint system. According to this invention, the ISO seatbelt lamp 68 is used as the supplemental inflatable restraint system backup or secondary indicator lamp. Chime module 86 and seatbelt switch 90 are typically included with the seatbelt system.

In operation of the system shown, after power-up of the vehicle, a signal is sent through line 72 to light lamp 68 for a time-out period. A similar signal is sent through line 70 to supplemental inflatable restraint system indicator lamp 66.

A resistor within chime module 86 ties line 84 to the vehicle supply voltage if switch 90 is not closed, indicating that the driver side seatbelt is fastened. If switch 90 is closed, indicating that the driver side seatbelt is not fastened, line 84 is tied to ground.

After power up of the vehicle, the chime module has a time-out period, during which it emits an audible signal as long as there is a ground signal on line 84, indicating that the seatbelt is not latched. Once the time-out period for the chime module expires or the signal on line 84 is higher than ground, the chime module ceases emitting its audible signal. Chime modules such as chime module 86 are readily available to those skilled in the art. During normal vehicle operation, the electronic control unit 74 monitors line 84, and if a ground is detected on line 84, indicating the driver side seatbelt is unlatched, lamp 68 is lit.

Immediately following vehicle power-up, electronic control unit 74 checks each of the components of the supplemental inflatable restraint system to determine if the supplemental inflatable restraint system indicator lamp 66 should remain lit. Reserve power unit 60, typically comprising a large capacitor, is checked by sensing the voltage across the capacitor to determine if the capacitor is charged to the proper voltage level. The reserve power unit 60 is also checked via a bit set in computer memory. The bit is set in EEPROM 82 at ignition off if the capacitor in reserve power unit 60 takes sufficient time to discharge. If at ignition off, the capacitor discharges too quickly, the bit in EEPROM 82 is not set, indicating that the capacitor in the reserve power unit 60 is faulty.

Accelerometer 94 is checked by monitoring the voltage at the accelerometer output and the voltage across the accelerometer bridge circuit. Additionally, during operation of the vehicle, the output voltage of accelerometer 94 is continuously checked, and if the voltage output achieves either a positive or ground rail level, then a fault in accelerometer 94 is indicated.

The driver and passenger side airbag deployment circuits 104 and 106 comprise the wiring and connections to the airbags, the inflation module, and the wiring and connections back to the control module 74. A typical check of the deployment circuits 104 and 106 involves providing power to the circuits and checking the voltage at lines 96 and 98 and the current draw of the circuits. Also, during operation of the vehicle, lines 96 and 98 are continuously checked for open and short circuits, either condition indicating a fault.

The airbag driver circuit 110, typically a transistor driver circuit which triggers the supplemental inflatable restraints through lines 102 and 108 in the event of a vehicle collision, is checked similarly to airbag deployment circuits 104 and 106.

The electronic control module 74 includes two grounds, one through the module casing, and one through a ground wire. Both grounds are checked, and if either is open, an error condition occurs. RAM 78 is checked by the electronic control unit 74 by a routine which writes data into the RAM 78, reads back the data, checking the data for integrity. ROM 80 and EEPROM 82 are checked by reading some of the contents of both units and checking that data for integrity.

The electronic control unit 74 may comprise a single chip microcomputer such as Motorola TM microcomputer no. MC68HC11. Reserve power unit 60, accelerometer 94, airbag deployment circuits 104 and 106, and airbag driver circuit 110 are all conventional circuits known to those skilled in the art and easily implemented by one skilled in the art without further elaboration herein. Additionally, the above system checks for the components illustrated in FIG. 3 are all well known to those skilled in the art and may be easily implemented by one skilled in the art without further elaboration herein.

Figure 4:
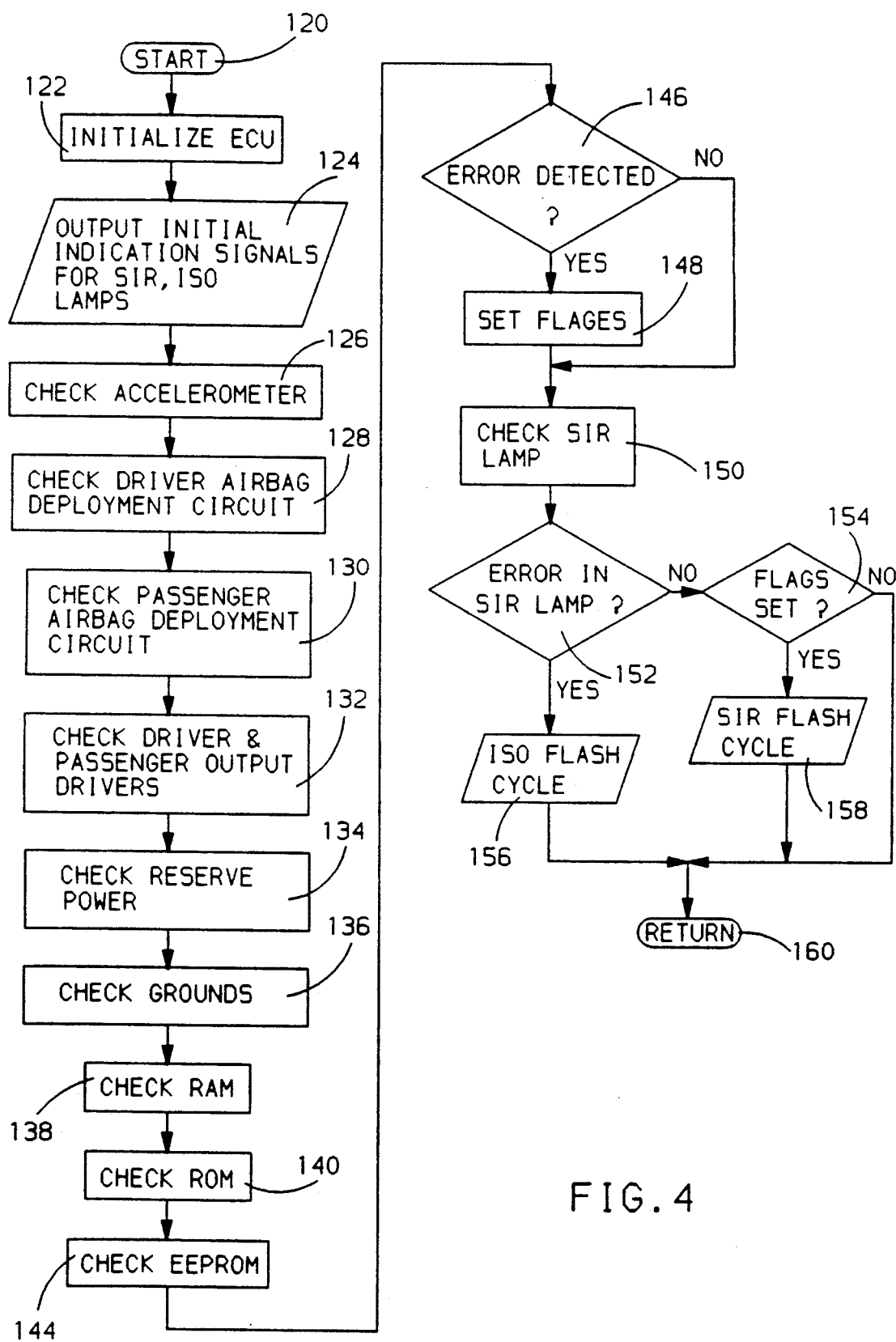
FIGS. 4, 5 and 6 are computer flow diagrams for an implementation of the example of this invention shown in FIG. 3.
Figure 5:
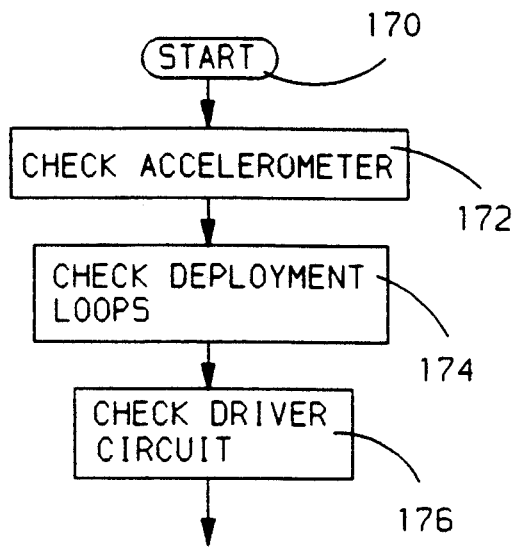

Referring to FIGS. 4 and 5, FIG. 4 shows a routine which may be implemented immediately following ignition on of the vehicle to check the supplemental inflatable restraint system as described with reference to FIG. 3. FIG. 5 illustrates an interrupt loop which checks part of the supplemental inflatable restraint system shown in FIG. 3 during operation of the vehicle.

Referring to FIG. 4, the computer implementation shown starts at block 120 and initializes the electronic control unit at block 122. At block 124, the computer outputs initial indication signals for the supplemental inflatable restraint indicator lamp and the ISO seatbelt indicator lamp. The signals output at block 124 comprise the signals which are output during the time-out period immediately after key on of the vehicle as described above. The operator observes the ISO seatbelt lamp and the supplemental inflatable restraint lamp during the time-out period and hears the audible signal from the chime module until the driver side seatbelt is fastened.

In blocks 126–144, the electronic control unit implements a routine of checking the system accelerometer, the driver and passenger side airbag deployment circuits, the output driver circuit, the reserve power unit, the system grounds and RAM, ROM and EEPROM units as described above. At block 146, the computer compares the signal obtained from the system check at blocks 126 through 144 against reference signals in computer memory to determine if an error in the system has occurred. If no error in the system has been detected, the computer jumps to block 150. If an error in the system is detected, the computer moves to block 148 where flags are set corresponding to the perspective errors found. The flags are preferably set in EEPROM, where they can later be read by a systems repair person to aid in the determination of the fault in the system.

At block 150 the circuit for the supplemental inflatable restraint system indicator lamp is checked as described above. Block 152 determines if there is an error in the circuit for the supplemental inflatable restraint indicator lamp. If there is an error in the circuit for the supplemental inflatable restraint indicator lamp, the computer moves to block 156 where it commands a flash cycle for the ISO seatbelt lamp, which serves as the backup or secondary lamp for the supplemental inflatable restraint system. A typical flash cycle may comprise ten on-off flashes of the lamp followed by ten minutes of the lamp being on, or continuous flashes of the lamp. A continuous flash of the ISO seatbelt lamp better differentiates a supplemental inflatable restraint system indication signal from an indication of an unlatched seatbelt, which is indicated by the I$0 seatbelt lamp being continuously lit. The flash cycle is repeated continuously while the vehicle ignition is on. The computer then moves to block 160 where it returns out of the subroutine.

At block 152, if no error in the supplemental inflatable restraint lamp was found, the computer continues to block 154 where it checks to see if any flags were set at block 148. If error flags are set, the computer moves to block 158 where it commands the supplemental inflatable restraint indicator lamp into a flash cycle. Similar to the flash cycle described above, the lamp is flashed on and off ten times, then held on for ten minutes, and is continuously repeated through the cycle. The computer continues from block 158 to block 160. If at block 154, no flags were set, the computer continues straight to block 160.

Referring to FIG. 5, during normal operation of the vehicle, an interrupt loop may periodically be run to check parts of the supplemental restraint system. In the example interrupt loop shown, the loop starts at block 170 and continues to block 172, where it checks the accelerometer. A typical check for the accelerometer during the interrupt loop, may be to compare the accelerometer output to the positive and ground rail voltages. If the accelerometer output is equal to either of these rail voltages, a fault is indicated for the accelerometer.

At block 174, the deployment loops are checked for open and short circuits. At block 176 the driver circuit for the air bags is checked for open and short circuits.

From block 176, the computer enters a routine similar to the routine shown in blocks 146-160 in FIG. 4, where the primary supplemental restraint system indicator lamp is lit if an error is detected during the interrupt loop. The ISO seatbelt lamp, which serves as the secondary supplemental inflatable restraint system indicator lamp, is lit if the primary supplemental inflatable restraint system indicator lamp is not properly functioning.

Figure 6:
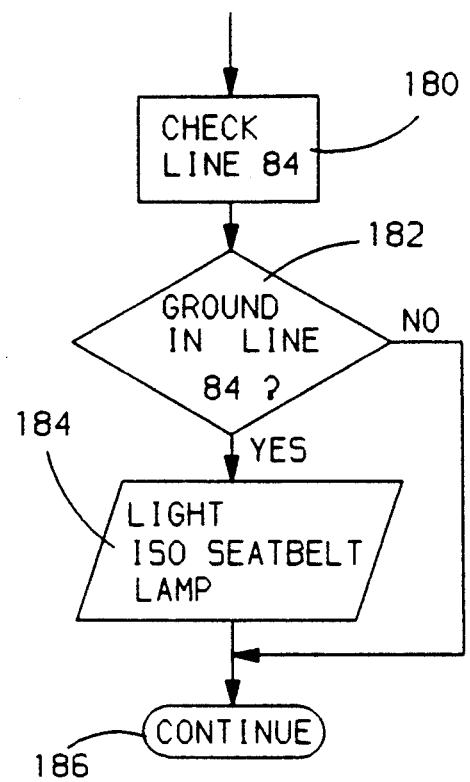

FIG. 6 shows a subroutine which may be implemented during continuous vehicle operation to check the state of the seatbelt system. At block 180, the voltage on line 84 is checked. If a ground in line 84 is detected, the computer moves from block 182 to block 184, where it outputs a command to light the I$0 seatbelt lamp. If a ground in line 84 is not detected, the computer moves straight from block 182 to block 186, where it continues out of the subroutine.

Figure 7:
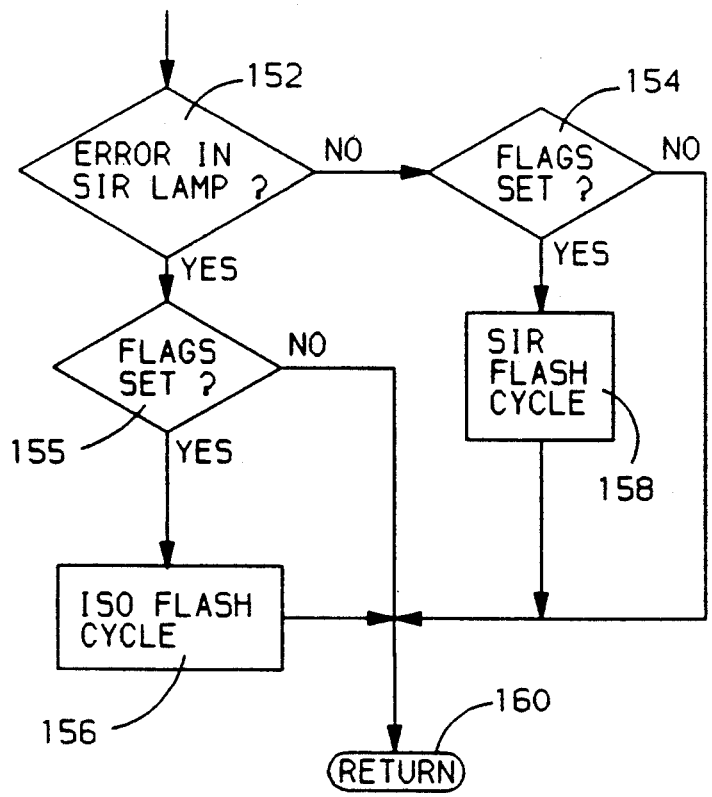
FIG. 7 is a computer flow diagram of an alternative implementation of this invention.

An optional alternative implementation, shown in FIG. 7, is to light the ISO seatbelt lamp only if both the supplemental inflatable restraint system indicator lamp is not functioning properly and there is a fault in the supplemental inflatable restraint system. In the Figure, blocks 152, 154, 156 and 158 operate as in FIG. 4. Block 155 is added so that the ISO seatbelt lamp is only lit as the backup lamp for the supplemental inflatable restraint system if there is an error in the supplemental inflatable restraint system.

The illustrated implementations set forth above are just examples of this invention and are not limiting on its scope. Moreover various other improvements and modifications to this invention may occur to those skilled in the art and fall within the scope of this invention as set forth below.

The embodiments of the invention in which an exclusive property or privilege is claimed are defined as follows:

1. A vehicle system comprising:
   a supplemental inflatable restraint system;
   a first indicator lamp for the supplemental restraint system;
   a seatbelt system;
   a second indicator lamp for the seatbelt system; and
   an electronic control unit controlling the first indicator lamp to communicate information relating to the supplemental inflatable restraint system and controlling the second indicator lamps to communicate information relating to the seatbelt system, wherein the electronic control unit:
   checks the first indicator lamp and a circuit for the first indicator lamp, and
   responsive to said check, controls the second indicator lamp to communicate information relating to the supplemental inflatable restraint system, illuminating the second indicator lamp in response to a failure of the circuit for the first indicator lamp.

* * * * *